(12) United States Patent
Bushman

(10) Patent No.: US 8,832,027 B1
(45) Date of Patent: Sep. 9, 2014

(54) CHANGE TRACKING BETWEEN SNAPSHOTS OF A SOURCE STORAGE

(71) Applicant: Storagecraft Technology Corporation, Draper, UT (US)

(72) Inventor: Nathan S. Bushman, Pleasant Grove, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 14/290,363

(22) Filed: May 29, 2014

Related U.S. Application Data

(60) Provisional application No. 61/971,520, filed on Mar. 28, 2014.

(51) Int. Cl.
*G06F 7/00* (2006.01)
*G06F 11/14* (2006.01)

(52) U.S. Cl.
CPC ................................. *G06F 11/1469* (2013.01)
USPC ............................ 707/639; 707/646; 707/659

(58) Field of Classification Search
CPC ............ G06F 2201/84; G06F 11/1446; G06F 17/30088
USPC .................................. 707/639, 646, 649, 659
See application file for complete search history.

(56) References Cited

U.S. PATENT DOCUMENTS

| | | | |
|---|---|---|---|
| 7,702,670 B1 * | 4/2010 | Duprey et al. | 707/646 |
| 7,840,533 B2 * | 11/2010 | Prahlad et al. | 707/610 |
| 8,150,808 B2 * | 4/2012 | Zha et al. | 707/639 |
| 2011/0093435 A1 * | 4/2011 | Zha et al. | 707/639 |
| 2012/0036106 A1 * | 2/2012 | Desai et al. | 707/645 |
| 2014/0108350 A1 * | 4/2014 | Marsden | 707/639 |

* cited by examiner

*Primary Examiner* — Cheyne D Ly
(74) *Attorney, Agent, or Firm* — Maschoff Brennan

(57) ABSTRACT

Change tracking between snapshots of a source storage. In one example embodiment, a method includes various steps. For example, the method includes, at time t(1), starting tracking, in a change log, locations in a source storage of all blocks that are changed after time t(1). The method also includes, between time t(1) and time t(3), changing a block in the source storage. The method further includes, at time t(3), creating a first snapshot of the source storage. The method also includes, after time t(3), creating a first image backup using the first snapshot. The method further includes, at time t(8), creating a second snapshot of the source storage. The method also includes, at time t(11), creating an incremental image backup that includes all blocks in the second snapshot that are tracked as having been changed in the change log after time t(1).

20 Claims, 3 Drawing Sheets

CHANGE TRACKING BETWEEN SNAPSHOTS OF A SOURCE STORAGE

CROSS-REFERENCE TO A RELATED APPLICATION

This application claims the benefit of and priority to U.S. Provisional Application No. 61/971,520, filed Mar. 28, 2014, titled "CHANGE TRACKING BETWEEN SNAPSHOTS OF A SOURCE STORAGE," which is incorporated herein by reference in its entirety.

FIELD

The embodiments disclosed herein relate to tracking changes to a source storage between snapshots of the source storage, and more particularly, to tracking changes to a source storage between snapshots of the source storage for the purpose of creating an incremental backup of the source storage.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One way to accomplish image backup is using snapshot technology, which enables the state of the source storage at a particular point in time (also known as the "snapshot time") to be captured without interrupting other processes, thus avoiding downtime of the source storage. Many snapshot technologies employ a "copy on write" methodology which requires that every write command, received by the file system of the source storage during a snapshot operation, be delayed until the original data block at the location targeted by the write command is copied for safekeeping to a new location. In this manner, the copied original blocks stored in the new location, as well as the unchanged original blocks stored in the source storage, are "frozen" at the snapshot time, which enables an image backup of the frozen data blocks to be created. Then, once the backup has been created, the snapshot operation can be discontinued and the data blocks that were copied for safekeeping to the new location can be discarded.

A source storage may be initially backed up using a snapshot operation to create a base backup and then incremental backups of the source storage may be created using successive snapshot operations. A new incremental backup may include only those blocks of the source storage that were changed subsequent to the previous snapshot time but prior to the most recent snapshot time. In order to easily back up only changed blocks during the creation of an incremental backup, it can be useful to incrementally track which blocks are changed between a previous snapshot time and a most recent snapshot time instead of determining which blocks are changed by performing a full compare of every block in the source storage with corresponding blocks in base and incremental backups that were previously created.

One common problem that is encountered during successive image backup operations is the difficulty of reliably tracking incremental changes prior to the creation of each incremental backup. For example, incremental changes are typically tracked in volatile memory between the two relevant snapshot times. For incremental change tracking to be reliable, the change tracking must guarantee that all changes to blocks between two snapshot times are recorded. However, because the timing of change tracking and the timing of snapshot operations can be difficult to coordinate, there is a risk that the incremental change tracking will be incomplete, which can result in an incomplete incremental image backup and loss of data.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to tracking changes to a source storage between snapshots of the source storage, and more particularly, to tracking of changes to a source storage between snapshots of the source storage for the purpose of creating an incremental image backup of the source storage. The example methods disclosed herein may be employed to eliminate the possibility that the change tracking will be incomplete, and thereby eliminate the possibility of data loss due to incomplete change tracking when creating an incremental image backup.

In one example embodiment, a method of tracking changes between snapshots of a source storage includes various steps. For example, the method includes, at time t(1), starting tracking, in a change log, locations in a source storage of all blocks that are changed after time t(1). The method also includes, between time t(1) and time t(3), changing a block in the source storage by a file system executing a write command. The method further includes, at time t(3), starting a first snapshot operation on the source storage. The first snapshot operation includes creating a first snapshot of the source storage by, for each write command including a target location received by the file system after time t(3), copying a block at the target location for safekeeping prior to changing the block at the target location by the file system executing the write command. The method also includes, after time t(3), creating a first image backup using the first snapshot. The method further includes, at time t(8), starting a second snapshot operation on the source storage. The second snapshot operation includes creating a second snapshot of the source storage by, for each write command including a target location received by the file system after time t(8), copying a block at the target location for safekeeping prior to changing the block at the target location by the file system executing the write command. The method also includes, at time t(11), creating an incremental image backup that includes all blocks in the second snapshot that are tracked as having been changed in the change log after time t(1).

In another example embodiment, a method of tracking changes between snapshots of a source storage includes various steps. For example, the method includes, at time t(1), starting tracking, in a change log, locations in a source storage of all blocks that are changed after time t(1). The method also includes, at time t(3), starting a first snapshot operation on the source storage. The first snapshot operation includes creating a first snapshot of the source storage by, for each write command including a target location received by the file system after time t(3), copying a block at the target location for safekeeping prior to changing the block at the target location by the file system executing the write command. The method further includes, after time t(3), creating a first image backup using the first snapshot. The method also includes, at time t(8), starting a second snapshot operation on the source storage. The second snapshot operation includes creating a second snapshot of the source storage by, for each write command including a target location received by the file system after time t(8), copying a block at the target location for safekeeping prior to changing the block at the target location by the file system executing the write command. The method further includes, between time t(8) and time t(11), changing a block in the source storage by a file system executing a write command. The method also includes, at time t(11), creating an incremental image backup that includes all blocks in the second snapshot that are tracked having been changed in the change log after time t(1).

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein relate to tracking changes to a source storage between snapshots of the source storage, and more particularly, to tracking of changes to a source storage between snapshots of the source storage for the purpose of creating an incremental image backup of the source storage. The example methods disclosed herein may be employed to eliminate the possibility that the change tracking will be incomplete, and thereby eliminate the possibility of data loss due to incomplete change tracking when creating an incremental image backup.

The term "storage" as used herein refers to computer-readable media, or some logical portion thereof such as a volume, capable of storing data in blocks. The term "block" as used herein refers to a fixed-length discrete sequence of bits. The term "backup" when used herein as a noun refers to a copy or copies of one or more blocks from a storage.

Figure 1:
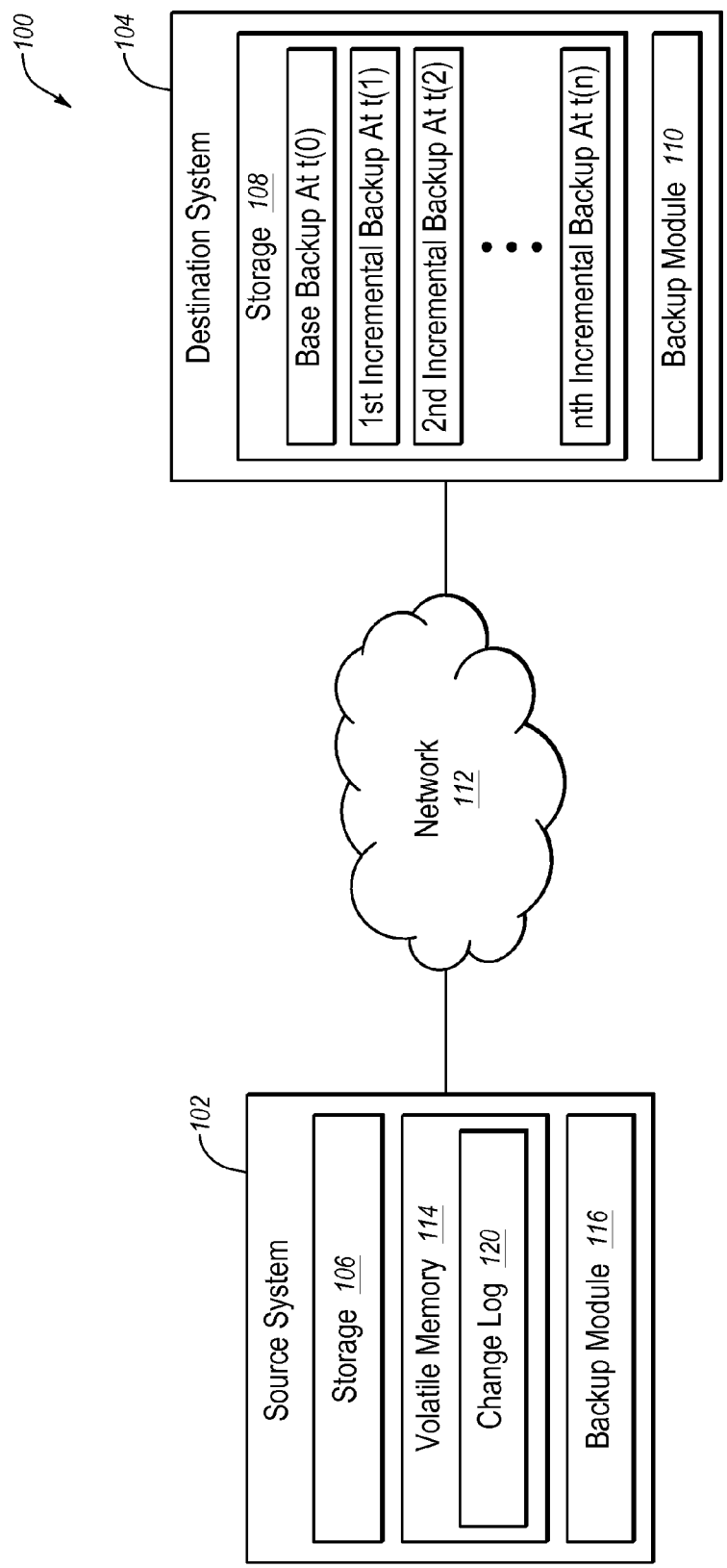
FIG. 1 is a schematic block diagram illustrating an example image backup system.

FIG. 1 is a schematic block diagram illustrating an example backup system 100. As disclosed in FIG. 1, the example backup system 100 includes a source system 102 and a destination system 104. The systems 102 and 104 include storages 106 and 108, respectively. The destination storage 108 stores a base backup and multiple incremental backups that represent the state of the source storage 106 at various snapshot times. For example, the base backup represents time t(0), the 1st incremental backup represents time t(1), the 2nd incremental backup represents time t(2), and the nth incremental backup represents time t(n). The destination system 104 also includes a backup module 110. The systems 102 and 104 are able to communicate with one another over a network 112. The source system 102 also includes a volatile memory 114 and a backup module 116. The source storage 106 stores blocks of data, which may be divided into one or more volumes for example, and the volatile memory 114 stores a change log 120.

Each of the systems 102 and 104 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash memory drives, and virtual machines. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

The image backup files stored in the destination storage 108 may be created by the backup module 110 and/or the backup module 116. For example, the backup module 110 and/or the backup module 116 may be configured to execute computer instructions to perform image backup operations of creating a base backup and multiple incremental backups of the source storage 106. It is noted that these image backups may initially be created on the source system 102 and then copied to the destination system 104.

For example, the base backup may be created to capture the state at time t(0). This image backup operation may include the backup module 110 copying all allocated blocks of the source storage 106 as allocated at time t(0) and storing the allocated blocks in the destination storage 108. The state of the source storage 106 at time t(0) may be captured using snapshot technology in order to capture the data stored in the source storage 106 at time t(0) without interrupting other processes, thus avoiding downtime of the source storage 106. The base backup may be very large depending on the size of the source storage 106 and the number of allocated blocks at time t(0). As a result, the base backup may take a relatively long time to create and consume a relatively large amount of space in the destination storage 108.

Next, the 1st and 2nd incremental backups may be created to capture the states at times t(1) and t(2), respectively. This may include copying only changed allocated blocks of the source storage 106 present at time t(1) and storing the changed allocated blocks in the destination storage 108, then later copying only changed allocated blocks of the source storage 106 present at time t(2) and storing the changed allocated blocks in the destination storage 108. The states of the source storage 106 at times t(1) and t(2) may again be captured using snapshot technology, thus avoiding downtime of the source storage 106. Each incremental backup may include only those allocated blocks from the source storage 106 that were changed after the time of the previous backup. Thus, the 1st incremental backup may include only those allocated blocks from the source storage 106 that changed between time t(0) and time t(1), and the 2nd incremental backup may include only those allocated blocks from the source storage 106 that changed between time t(1) and time t(2). In general, as compared to the base backup, each incremental backup may take a relatively short time to create and consume a relatively small storage space in the destination storage 108.

Finally, an nth incremental backup may be created to capture the state at time t(n). This may include copying only changed allocated blocks of the source storage 106 present at time t(n), using snapshot technology, and storing the changed allocated blocks in the destination storage 108. The nth incremental backup may include only those allocated blocks from the source storage 106 that changed between time t(n) and time t(n−1).

Therefore, incremental backups may be created on an ongoing basis. The frequency of creating new incremental backups may be altered as desired in order to adjust the amount of data that will be lost should the source storage 106 experience corruption of its stored data or become unavailable at any given point in time. The data from the source storage 106 can be restored to the state at the point in time of a particular backup by applying the image backup file(s) to a restore storage from oldest to newest, namely, first applying the base backup and then applying any successive incremental backup(s). The restore storage may be the source storage 106 or some other storage.

Although only allocated blocks are included in the example incremental backups discussed above, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks. Further, although only base backups and incremental backup files are discussed above, it is understood that the source storage 106 may instead be backed up by creating a base backup and one or more decremental image backup files. Therefore, the methods disclosed herein are not limited to tracking changes between base and incremental backups, but may also include tracking changes between base and decremental backups.

During performance of the example methods disclosed herein, the backup module 116 may track incremental changes to the source storage 106 between snapshots of the source storage 106. For example, the backup module 116 may track incremental changes to the source storage 106 between the snapshot time t(1) of a second snapshot operation and the snapshot time t(2) of a third snapshot operation. These changes may be tracked in the change log 120. The example methods disclosed herein can reliably guarantee that the blocks tracked as having been changed in the change log 120 include all blocks of the source storage 106 that were changed between the first and second relevant snapshot times, although the change log 120 may additionally be over-inclusive in that it may also track additional blocks that were changed just prior to the first relevant snapshot time and/or that were changed just subsequent to the second relevant snapshot time. As discussed in greater detail below, this potentially over-inclusive change tracking performed by the backup module 116 causes little harm and has the benefit of eliminating the possibility that the change tracking will be incomplete, and thereby also eliminates the possibility of data loss due to incomplete change tracking when creating an incremental backup.

In one example embodiment, the source system 102 may be a desktop computer, the destination system 104 may be a file server, and the network 112 may include the internet. In this example embodiment, the file server may be configured to periodically back up the storage of the desktop computer over the internet as part of a backup job by creating the base backup and the multiple incremental backups stored in the destination storage 108. The desktop computer may also be configured to track incremental changes to its storage between snapshots in order to easily and quickly identify only those blocks that changed for inclusion in an incremental backup. The file server may also be configured to restore one or more of the image backup files to the storage of the desktop computer over the internet if the desktop computer experiences corruption or a user simply desires to restore the storage of the desktop computer to an earlier point in time.

Although only a single storage is disclosed in each of the systems 102 and 104 in FIG. 1, it is understood that any of the systems 102 and 104 may instead include two or more storages. Further, although the systems 102 and 104 are disclosed in FIG. 1 as communicating over the network 112, it is understood that the systems 102 and 104 may instead communicate directly with each other. For example, in some embodiments the systems 102 and 104 may be combined into a single system. Also, although the storages 106 and 108 are disclosed as separate storages, it is understood that the storages 106 and 108 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. In another example, the source system 102 may have a separate storage (not shown) to which a backup of the source storage 106 is restored. In both of these examples, the source system 102 functions as both a source system and a destination system. Further, although the backup modules 110 and 116 are the only modules disclosed in the example backup system 100 of FIG. 1, it is understood that the functionality of the backup modules 110 and 116 may be replaced or augmented by one or more similar modules residing on either of the systems 102 and 104 or another system.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2:
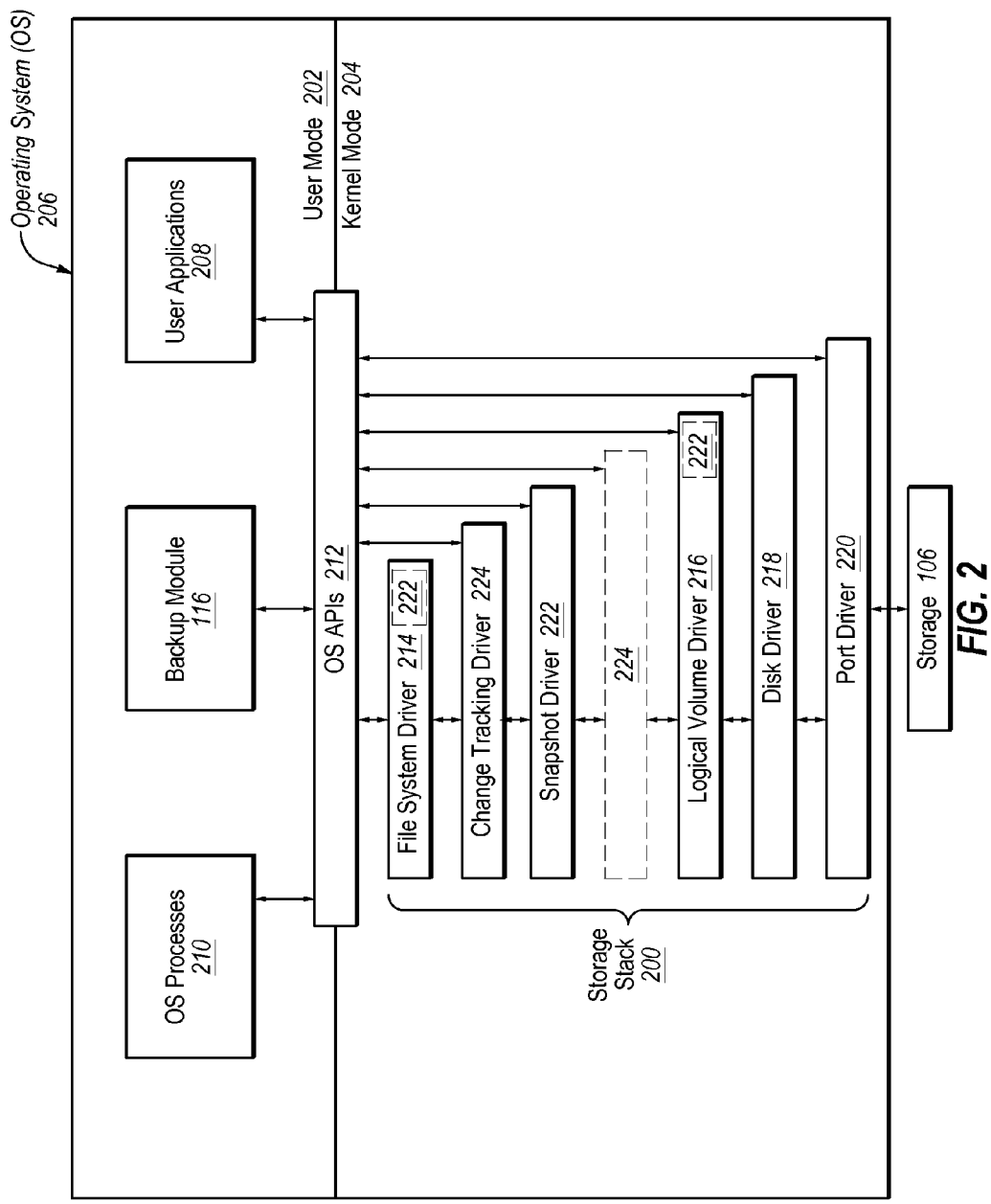
FIG. 2 is a simplified block diagram of an operating system of a source system of FIG. 1.

FIG. 2 is a simplified block diagram of an operating system (OS) 206 of the source system 102 of FIG. 1. As disclosed in FIG. 2, the OS 206 is generally divided between a user mode 202 and a kernel mode 204. The user mode 202 includes OS processes 210 and user applications 208 configured for operation with the OS 206. The OS 206 may also include OS Application Program Interfaces (APIs) 212 for providing functionality to, and a general interface between, modules in the user mode 202 and the kernel mode 204.

The kernel mode 204 includes lower level operating system modules, such as a file system driver 214, a logical volume driver 216, and device drivers for the various hardware devices in the source system 102. Modules within the OS 206, including components in the user mode 202 and the kernel mode 204, or any other component that is capable of interacting with the APIs 212, can make use of the APIs 212 to initiate file Input/Output (I/O) requests which may take the form of read commands and write commands (also referred to as read and write access requests) to the file system driver 214. The OS modules which handle file I/O requests generally form a storage stack 200.

The file system driver 214 passes these access requests on to the logical volume driver 216 to determine what disk(s), and what sector(s) on the disk(s), should be accessed to perform the access requests. The logical volume driver 216 then passes these access requests with disk-specific information, such as disk sector location(s), to a disk driver 218. Disk requests, which may be local or remote, are made to a port driver 220 that converts the disk request into the necessary hardware controls to retrieve or store the desired data on the source storage 106. Of course, as stated earlier, the source storage 106 may include multiple logical volumes on different partitions of the disk.

The source storage 106 may be any of a variety of devices, such as magnetic disks, optical disks, solid state disks, Universal Serial Bus (USB) drives, and the like.

The user mode 202 may also include the backup module 116. The backup module 116, as noted above, may be configured to perform image backup operations of creating a base backup and multiple incremental backups of the source storage 106. Also noted above, the backup module 116 may be configured to utilize snapshot technology, which enables the state of the source storage 106 at a snapshot time to be captured without interrupting other processes, thus avoiding downtime of the source storage 106.

The snapshot technology for the source system 102 may be implemented by a snapshot driver 222, which may sit between the file system driver 214 and the logical volume driver 216, may be part of the file system driver 214, may be part of the logical volume driver 216, or may be implemented as some combination of these alternatives, as disclosed in FIG. 2. For example, in some example embodiments, the snapshot driver 222 may be implemented as part of the file system driver 214 as well as being a driver below the file system driver 214. The snapshot driver 222 may be configured to receive a command to start a snapshot operation, a command to finish a snapshot operation, and various other commands relating to snapshot operations such as a command to discard blocks that were safeguarded as part of a snapshot operation or a command to retrieve metadata related to a particular snapshot operations such as a snapshot time or a snapshot size.

The backup module 116 may also be configured to employ a change tracking driver 224 to incrementally track which blocks are changed in the source storage 106 between a previous snapshot time and a most recent snapshot time, instead of determining which blocks are changed by performing a full compare of every block in the source storage 106 with corresponding blocks in base and incremental backups that were previously created. The change tracking driver 224 may sit between the file system driver 214 and the logical volume control 216, either above or below the snapshot driver 222, as disclosed in FIG. 2.

In general, the backup module 116 may send commands through the file system driver 214 to the snapshot driver 222. However, especially where the snapshot driver 222 is native to the OS 206, it may be difficult or impossible to predict exactly when a command sent from the backup module 116 to the snapshot driver 222 will be received and executed. For example, where the backup module 116 sends a command to start a snapshot operation to the snapshot driver 222, it may be difficult or impossible for the backup module 116 to predict exactly when the snapshot driver 222 will receive the command and start the snapshot operation, and thus also be difficult or impossible to predict the snapshot time of the snapshot operation.

Some example backup methods solve this difficulty in predicting receipt and execution of commands by the snapshot driver 222 by employing a "flush and hold" technology which allows, among other things, all write commands sent to the file system driver 214 to be held upon the receipt of a command to start a snapshot operation to the snapshot driver 222, thereby preventing any additional write commands from reaching the source storage 106 between the time that the command to start a snapshot operation is first received by the file system driver 214 and the time that the command to start a snapshot operation is actually received and executed by the snapshot driver 222 and a confirmation of the execution is sent back up to the file system driver 214. However, other example backup methods, such as those disclosed in the present application, do not depend on any such "flush and hold" technology being utilized or even available in the file system driver 214.

Instead, the example methods disclosed herein enable the backup module 116 to communicate independently with the change tracking driver 224 and with the snapshot driver 222. Therefore, even though the backup module 116 cannot always predict exactly when a snapshot operation will start (which starting defines the snapshot time of the snapshot operation), the backup module 116 can guarantee that the tracking of changes between first and second snapshot times will start before the first snapshot time and not finish until after the second snapshot time.

In particular, the example methods disclosed herein enable the backup module 116 to communicate directly with the change tracking driver 224 to start tracking changes to the source storage 106 prior to the backup module 116 sending a command to start a snapshot operation to the snapshot driver 222. In addition, the example methods disclosed herein enable the backup module 116 to communicate directly with the change tracking driver 224 to finish tracking changes to the source storage 106 subsequent to the backup module 116 sending a command to start the next snapshot operation to the snapshot driver 222. In this manner, the backup module 116 can guarantee that the change tracking operation, performed by the change tracking driver 224, has started before the snapshot operation is started by the snapshot driver 222 and finishes only after the next snapshot operation is started by the snapshot driver 222. Although it is possible that one or more write commands may pass through the file system driver 214 between the time that the backup module 116 starts the change tracking operation and the time that the backup module 116 starts the snapshot operation, or between the time that the backup module 116 starts the next snapshot operation and the time that the backup module 116 finishes the change tracking, and thus the change log 120 may track writes that actually occurred prior to the first snapshot time of the first snapshot operation or subsequent to the second snapshot time of the second snapshot operation, this potentially over-inclusive change tracking performed by the backup module 116 does little harm (as it, at worst, results in an incremental backup that is slightly larger than it otherwise would have been). On the other hand, this potentially over-inclusive change tracking has the extremely valuable benefit of eliminating the possibility that the change tracking will be incomplete, and thereby eliminate the possibility of data loss due to incomplete change tracking when creating an incremental backup. In addition, the potentially over-inclusive change tracking also functions without the change tracking driver 224 needing to be capable of intercepting a command to start a snapshot operation, thus allowing the change tracking driver 224 to sit below the snapshot driver 222 in the storage stack 200.

It is further noted that some example methods of tracking changes between snapshots start the change tracking operation at essentially the same time that the snapshot operation is started (as a single atomic transaction), thereby ensuring that no write commands can occur to the source storage between the time that the snapshot operation is started and the time that the change tracking is started. However, these methods generally rely on a single driver that is capable of executing both snapshot operations as well as change tracking operations.

In the example methods disclosed herein, however, the change tracking driver 224 is separate from, and operates independent from, the snapshot driver 222 due, for example, to the snapshot driver 222 being native to the OS 206 while the change tracking driver 224 is proprietary software from a different vendor. While one example solution to this separate and independent operation is the intercepting of snapshot commands and employing the "flush and hold" technology described above, this solution is limited to environments where snapshot commands are able to be intercepted. The example methods disclosed herein are not limited to environments where snapshot commands are able to be intercepted.

Figure 3:
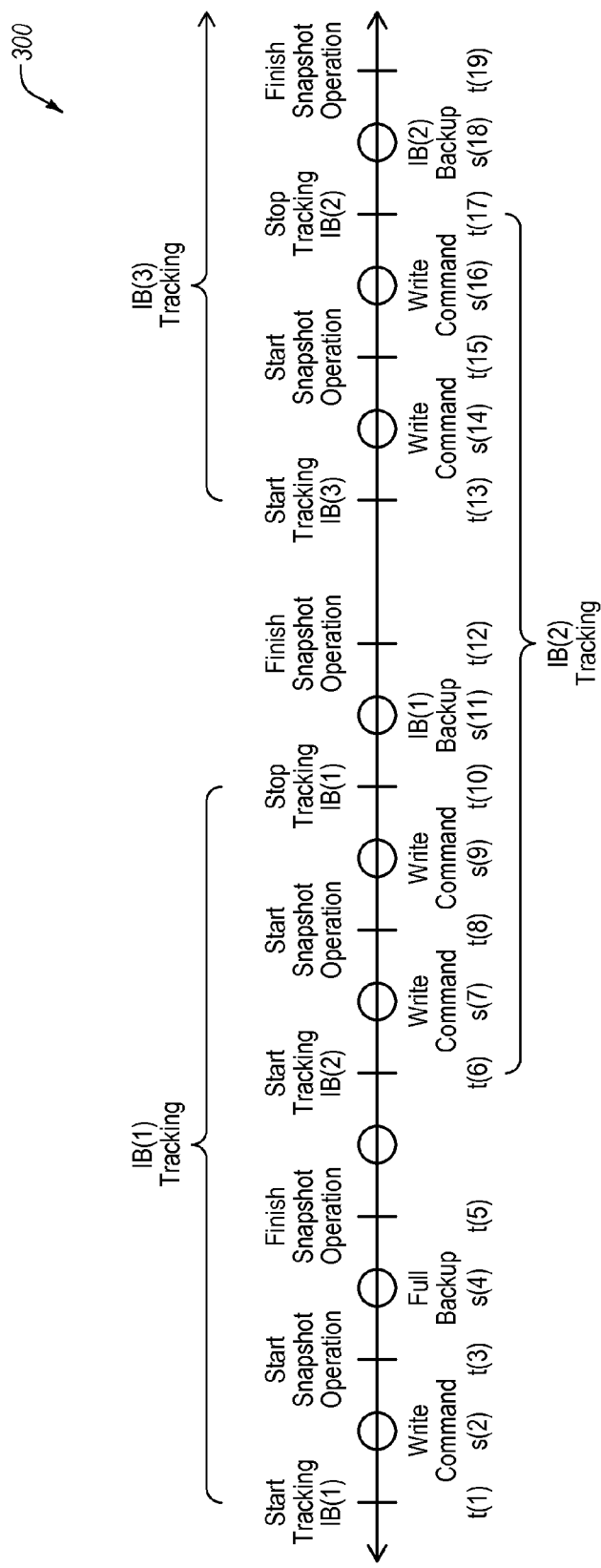
FIG. 3 is a timeline of an example method of tracking changes between snapshots of a source storage of FIG. 1.

FIG. 3 is a timeline of an example method 300 of tracking changes between snapshots of the source storage 106. The tick marks in the timeline represent a particular point in time, while the circles in the timeline represent a particular span of time. As disclosed in FIG. 3, the timeline of the method 300 runs from before time t(1) until after time t(19). As discussed herein and as used in the claims, a time with a label (x) is at least as late in time as a time with a label (x−1).

At time t(1), the change tracking driver 224 starts tracking, in the change log 120, locations in the source storage 106 of all blocks that are changed between time t(1) and time t(10), for inclusion in a first incremental backup IB(1). This change tracking operation may be initiated by the backup module 116 sending a command to start tracking to the change tracking driver 224, and may result in the change tracking driver 224 sending a confirmation to the backup module 116.

At time t(3), the snapshot driver 222 starts a first snapshot operation on the source storage 106, which includes creating a first snapshot of the source storage 106 by, for each write command including a target location received by the file system driver 214 after time t(3), copying a block at the target location for safekeeping prior to changing the block at the target location by the file system driver 214 executing the write command. This first snapshot operation may be initiated by the backup module 116 sending a command to start the first snapshot operation to the snapshot driver 222, and may result in the snapshot driver 222 sending a confirmation to the backup module 116.

Between time t(1) and time t(3), and during span s(2), one or more blocks in the source storage 106 may be changed by the file system driver 214 executing a write command. Thus, the change tracking that began at time t(1) for the first incremental backup IB(1) will track, in the change log 120, the locations of these one or more changed blocks.

During span s(4), the backup module 116 creates a full image backup using the first snapshot. As noted above, a full image backup may include all blocks captured in the first snapshot, or may only include all allocated blocks captured in the first snapshot.

At time t(5), the snapshot driver 222 finishes the first snapshot operation. After finishing the first snapshot operation, the snapshot driver 222 may also discard the first snapshot where it is no longer needed. This conclusion of the first snapshot operation may be instigated by the backup module 116 sending a command to finish the first snapshot operation to the snapshot driver 222, and may result in the snapshot driver 222 sending a confirmation to the backup module 116.

At time t(6), the change tracking driver 224 starts tracking, in the change log 120, locations in the source storage 106 of all blocks that are changed between time t(6) and time t(17), for inclusion in a second incremental backup IB(2). This change tracking operation may be initiated by the backup module 116 sending a command to start tracking to the change tracking driver 224, and may result in the change tracking driver 224 sending a confirmation to the backup module 116.

At time t(8), the snapshot driver 222 starts a second snapshot operation on the source storage 106, which includes creating a second snapshot of the source storage 106. This second snapshot operation may be initiated by the backup module 116 sending a command to start the second snapshot operation to the snapshot driver 222, and may result in the snapshot driver 222 sending a confirmation to the backup module 116.

At time t(10), the change tracking driver 224 finishes tracking, in the change log 120, locations in the source storage of all blocks that are changed between time t(1) and time t(10).

Between time t(6) and time t(8) (during span s(7)), and/or between time t(8) and time t(10) (during span s(9)), one or more blocks in the source storage 106 may be changed by the file system driver 214 executing a write command. Thus, the change tracking for the second increment backup IB(2) that began at time t(6) will track the locations of these one or more changed blocks in the change log 120. It is noted that the change tracking for the first incremental backup incremental backup IB(1) that began at time t(1) and is still ongoing during span s(7) and span s(9) will also will track the locations of these one or more changed blocks in the change log 120.

At time t(11), the backup module 116 creates the first incremental backup IB(1) that includes all blocks in the second snapshot that are tracked as having been changed in the change log 120 between time t(1) and time t(10).

At time t(12), the snapshot driver 222 finishes the second snapshot operation. After finishing the second snapshot operation, the snapshot driver 222 may also discard the second snapshot where it is no longer needed. This conclusion of the second snapshot operation may be instigated by the backup module 116 sending a command to finish the second snapshot operation to the snapshot driver 222, and may result in the snapshot driver 222 sending a confirmation to the backup module 116.

The operations at times t(13), t(15), t(17), and t(19) are similar to the operations at times t(6), t(8), t(10), and t(12), and the operations at spans s(14), s(16), and s(18) are similar to the operations at spans s(7), s(9), and s(11) except that they deal with the starting of the third incremental backup IB(3) tracking and snapshot and the finishing of the second incremental backup IB(2) snapshot and tracking.

It is noted that the finishing of the snapshot operations and the finishing of the change tracking operations are optional and also may be performed later than shown in the timeline of the method 300. It is further noted that the change log 120 maybe be implemented as a bitmap or any other data structure capable of keeping track of locations of changed blocks in the source storage 102. The change log 120 may further be configured to distinguish between sets of changes, such as those changes to be used in the creation of the first incremental backup IB(1) versus those changes to be used for the second incremental backup IB(2). It is also noted that just as the snapshot for the first incremental backup IB(1) may be discarded after the first incremental backup IB(1) has finished being created, any changes logged for the first incremental backup IB(1) in the change log may also be discarded from the change log 120 after the first incremental backup IB(1) has finished being created.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general-purpose computer, special-purpose computer, or virtual computer such as a virtual machine. Combinations of the above may also be included within the scope of computer-readable media.

Computer-executable instructions comprise, for example, instructions and data which cause a general-purpose computer, special-purpose computer, or virtual computer such as a virtual machine to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" or "filter" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method of tracking changes between snapshots of a source storage, the method comprising:
   at time t(1), starting tracking, in a change log, locations in a source storage of all blocks that are changed after time t(1);
   between time t(1) and time t(3), changing a block in the source storage by a file system executing a write command;
   at time t(3), starting a first snapshot operation on the source storage, the first snapshot operation including creating a first snapshot of the source storage by, for each write command including a target location received by the file system after time t(3), copying a block at the target location for safekeeping prior to changing the block at the target location by the file system executing the write command;
   after time t(3), creating a first image backup using the first snapshot;
   at time t(8), starting a second snapshot operation on the source storage, the second snapshot operation including creating a second snapshot of the source storage by, for each write command including a target location received by the file system after time t(8), copying a block at the target location for safekeeping prior to changing the block at the target location by the file system executing the write command; and
   at time t(11), creating an incremental image backup that includes all blocks in the second snapshot that are tracked as having been changed in the change log after time t(1).

2. The method as recited in claim 1, wherein the first image backup is a full image backup.

3. The method as recited in claim 1, wherein the first image backup is an incremental image backup.

4. The method as recited in claim 1, further comprising:
   at time t(5), finishing the first snapshot operation and discarding the first snapshot.

5. The method as recited in claim 1, further comprising:
   at time t(6), starting tracking, in a change log, locations in a source storage of all blocks that are changed after time t(6).

6. The method as recited in claim 1, further comprising:
   between time t(6) and time t(8), changing a block in the source storage by the file system executing a write command.

7. The method as recited in claim 1, further comprising:
between time t(8) and time t(10), changing a block in the source storage by the file system executing a write command.

8. The method as recited in claim 7, further comprising:
at time t(10), finishing tracking, in the change log, locations in the source storage of all blocks that are changed after time t(1).

9. The method as recited in claim 8, further comprising:
at time t(12), finishing the second snapshot operation and discarding the second snapshot.

10. A non-transitory computer-readable medium storing a program that causes a processor to execute the method as recited in claim 1.

11. A method of tracking changes between snapshots of a source storage, the method comprising:
at time t(1), starting tracking, in a change log, locations in a source storage of all blocks that are changed after time t(1);
at time t(3), starting a first snapshot operation on the source storage, the first snapshot operation including creating a first snapshot of the source storage by, for each write command including a target location received by the file system after time t(3), copying a block at the target location for safekeeping prior to changing the block at the target location by the file system executing the write command;
after time t(3), creating a first image backup using the first snapshot;
at time t(8), starting a second snapshot operation on the source storage, the second snapshot operation including creating a second snapshot of the source storage by, for each write command including a target location received by the file system after time t(8), copying a block at the target location for safekeeping prior to changing the block at the target location by the file system executing the write command;
between time t(8) and time t(11), changing a block in the source storage by a file system executing a write command; and
at time t(11), creating an incremental image backup that includes all blocks in the second snapshot that are tracked having been changed in the change log after time t(1).

12. The method as recited in claim 11, wherein the first image backup is a full image backup.

13. The method as recited in claim 11, wherein the first image backup is an incremental image backup.

14. The method as recited in claim 11, further comprising:
at time t(5), finishing the first snapshot operation and discarding the first snapshot.

15. The method as recited in claim 11, further comprising:
at time t(6), starting tracking, in a change log, locations in a source storage of all blocks that are changed after time t(6).

16. The method as recited in claim 11, further comprising:
between time t(1) and time t(3), changing a block in the source storage by the file system executing a write command.

17. The method as recited in claim 11, further comprising:
between time t(6) and time t(8), changing a block in the source storage by a file system executing a write command.

18. The method as recited in claim 17, further comprising:
at time t(10), finishing tracking, in the change log, locations in the source storage of all blocks that are changed after time t(1).

19. The method as recited in claim 18, further comprising:
at time t(12), finishing the second snapshot operation and discarding the second snapshot.

20. A non-transitory computer-readable medium storing a program that causes a processor to execute the method as recited in claim 11.

* * * * *